US012012937B2

(12) United States Patent
Bertelsen et al.

(10) Patent No.: US 12,012,937 B2
(45) Date of Patent: Jun. 18, 2024

(54) CONTROLLER FOR DETECTING AN ICE EVENT AT A WIND FARM

(71) Applicant: VESTAS WIND SYSTEMS A/S, Aarhus N (DK)

(72) Inventors: Kresten Bertelsen, Åbyhøj (DK); Asier Berra, Billund (DK); Carsten Krogh Nielsen, Hammel (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 449 days.

(21) Appl. No.: 17/288,859

(22) PCT Filed: Oct. 22, 2019

(86) PCT No.: PCT/DK2019/050318
§ 371 (c)(1),
(2) Date: Apr. 26, 2021

(87) PCT Pub. No.: WO2020/083451
PCT Pub. Date: Apr. 30, 2020

(65) Prior Publication Data

US 2022/0003210 A1    Jan. 6, 2022

(30) Foreign Application Priority Data

Oct. 26, 2018   (DK) .......................... PA 2018 70696

(51) Int. Cl.
*F03D 7/04* (2006.01)
*F03D 17/00* (2016.01)
*F03D 80/40* (2016.01)

(52) U.S. Cl.
CPC ............. *F03D 7/048* (2013.01); *F03D 17/00* (2016.05); *F03D 80/40* (2016.05); *F05B 2270/32* (2013.01); *F05B 2270/325* (2013.01)

(58) Field of Classification Search
CPC ................................. F03D 80/40; F03D 7/048
See application file for complete search history.

(56) References Cited

U.S. PATENT DOCUMENTS 6,890,152 B1    5/2005  Thisted
7,857,586 B2 *  12/2010 Wobben ................ F03D 7/0264
                                                          416/1

(Continued)

FOREIGN PATENT DOCUMENTS

CN          105089929 A    11/2015
EP            2199606 A2     6/2010

(Continued)

OTHER PUBLICATIONS

PCT International Search Report for Application No. PCT/DK2019/050318 dated Aug. 1, 2020.

(Continued)

*Primary Examiner* — J. Todd Newton
*Assistant Examiner* — Wesley Le Fisher
(74) *Attorney, Agent, or Firm* — Patterson + Sheridan, LLP

(57) ABSTRACT

Techniques for determining the presence of ice at a wind farm with a number of wind turbines. The controller receives a current ambient temperature of the wind farm. The controller also receives a measured current wind speed from wind speed sensors of the wind turbines. The controller also receives an estimated current wind speed of each of the wind turbines that is based on measured performance parameters of the associated wind turbine. The controller determines a current wind speed difference between the measured current wind speed and the estimated current wind speed for each of the wind turbines, and determines a current delta distribution based on the current wind speed differences. The controller also determines whether an ice event has occurred, the determination being in dependence on the current ambient (Continued)

temperature and in dependence on the current delta distribution, and then outputs an outcome of the ice event determination.

20 Claims, 4 Drawing Sheets

(56) References Cited

U.S. PATENT DOCUMENTS

| | | | | |
|---|---|---|---|---|
| 7,909,574 | B2* | 3/2011 | Kumar | F03D 7/047 |
| | | | | 416/61 |
| 8,050,887 | B2* | 11/2011 | Ahmann | F03D 80/40 |
| | | | | 702/142 |
| 8,258,643 | B2* | 9/2012 | Bonnet | F03D 7/0296 |
| | | | | 290/55 |
| 8,393,864 | B2* | 3/2013 | Wobben | F03D 80/40 |
| | | | | 416/61 |
| 9,458,824 | B2* | 10/2016 | Giertz | F03D 3/00 |
| 9,518,561 | B2* | 12/2016 | De Boer | F03D 80/40 |
| 9,759,193 | B2* | 9/2017 | Jepsen | F03D 80/40 |
| 2007/0154310 | A1* | 7/2007 | Wobben | F03D 7/0264 |
| | | | | 416/1 |
| 2010/0143120 | A1* | 6/2010 | Kumar | F03D 7/048 |
| | | | | 416/61 |
| 2010/0143127 | A1* | 6/2010 | Ahmann | F03D 80/40 |
| | | | | 73/861.85 |
| 2011/0081226 | A1* | 4/2011 | Wobben | F03D 7/046 |
| | | | | 415/118 |
| 2012/0226485 | A1 | 9/2012 | Creagh et al. | |
| 2015/0292486 | A1* | 10/2015 | Zhou | F03D 80/40 |
| | | | | 702/35 |

FOREIGN PATENT DOCUMENTS

| | | |
|---|---|---|
| WO | 2017167346 A1 | 10/2017 |
| WO | 2018113889 A1 | 6/2018 |
| WO | 2020083451 A1 | 4/2020 |

OTHER PUBLICATIONS

PCT Written Opinion of the International Searching Authority for Application No. PCT/DK2019/050318 dated Oct. 14, 2019.
Danish Patent and Trademark Office 1st Technical Examination for Application No. PA 2018 70696 dated Oct. 24, 2019.

* cited by examiner

CONTROLLER FOR DETECTING AN ICE EVENT AT A WIND FARM

FIELD OF THE INVENTION

The present invention relates to a controller for a wind farm and particularly, but not exclusively, to a controller for determining the presence of ice at a wind farm. Aspects of the invention relate to a controller, to a method, and to a wind farm.

BACKGROUND

Wind turbines are normally provided with a rotor in the form of a rotatable hub carrying a set of wind turbine blades. The wind acts on the wind turbine blades, thereby causing the hub to rotate. The rotational movements of the hub are transferred to a generator, either via a gear arrangement or directly, in the case that the wind turbine is of so-called direct drive type. In the generator, electrical energy is generated, which may be supplied to a power grid.

Often, a group of wind turbines is arranged within a site, i.e. a well-defined geographical area, known as a wind farm. The wind farm may be arranged on-shore or off-shore. The wind turbines of a wind farm are sometimes at least partly controlled in dependence on each other. Wind farms are also sometimes referred to as 'wind power plants' or 'wind parks'.

It is common for wind turbines in a wind farm to be provided with after-sale upgrades during the lifetime of the wind turbines in order to improve their performance. In particular, a current performance of the wind turbines in a wind farm relative to each other needs to be accurately determined to inform a decision on which wind turbine or turbines to upgrade, and also to determine the effect of any upgrade.

It is therefore crucial that the collected or measured data on which the current performance of the wind turbines is based is accurate. It is particularly difficult to measure the performance of a wind turbine in cold climates, and therefore difficult to validate the effect of any upgrades in such conditions. Specifically, the presence of ice at a wind farm in such cold climate conditions can have a severe impact on the performance of a wind turbine. This means that there is a risk that any measured change in performance in cold climate conditions is not because of an installed upgrade, but simply because of changing levels of ice at the wind farm.

Therefore it is crucial to be able to determine when there is ice present at a wind farm so as to be able to accurately filter collected wind turbine performance data that has been affected by an ice event.

One way to ensure that the collected wind turbine performance data is ice-free, i.e. not affected by ice, is to remove all data that has been obtained when the temperature at a wind farm is such that ice may be present. Typically, this is achieved by discarding all of the collected performance data below a given temperature threshold. This suffers the disadvantage of excessive loss of performance data, in particular on wind farms where the ambient temperature is often or even always below the given temperature threshold. Such high levels of data loss can make validation of wind turbine upgrades difficult or even impossible.

It is an aim of the present invention to address disadvantages associated with the prior art.

SUMMARY OF INVENTION

According to an aspect of the present invention there is provided controller for determining the presence of ice at a wind farm including a plurality of wind turbines each having a wind speed sensor. The controller comprises an input that may be configured to receive a current ambient temperature of the wind farm. The input may be configured to receive a measured current wind speed from each of the wind speed sensors. The input may be configured to receive an estimated current wind speed of each of the wind turbines, wherein each of the estimated current wind speeds is based on relevant performance parameters of the associated wind turbine. For example, the relevant performance parameters may include a measured power output of the associated wind turbine. The controller comprises a processor. The processor may be configured to determine a current wind speed difference, also referred to a current wind speed delta, between the measured current wind speed and the estimated current wind speed for each of the wind turbines. The processor may be configured to determine a current wind speed difference distribution, also referred to as a wind speed delta distribution, based on the current wind speed differences. The processor may be configured to determine whether an ice event has occurred, the determination being in dependence on the current ambient temperature and in dependence on the current wind speed difference distribution or current wind speed delta distribution. The controller comprises an output that may be configured to provide an outcome of the ice event determination.

The present invention provides an improved way of determining whether a wind farm has been affected by ice. In particular, the present invention results in lower levels of performance data being discarded when assessing a current performance of one or more of the turbines relative to the known methods outlined above. For example, known methods may discard around 40% of collected data associated with an ambient temperature below the threshold temperature, whereas the present invention may only discard 5-10%, e.g. around 6%, on average of the collected data in such conditions. This is because the known methods described above discard all performance data in which ice could be present by discarding all performance data associated with an ambient temperature below a threshold temperature, whereas the present invention provides an actual determination of the presence of ice and therefore performance data is only discarded when ice is actually determined to be present at the wind farm. This results in improved validation of performance gains of wind turbines that have been fitted with one or more after-sale upgrade features, particularly on wind farms that are subject to ambient temperatures where ice may be present for a significant portion of the year.

The present invention advantageously makes a determination based on a plurality of wind turbines, for example all of the wind turbines, in the wind farm instead of based on a single wind turbine as this gives more certainty to individual measurements and makes it easier to identify outlier measurements. In particular, if ice is present at the wind farm it would be expected to affect the collected data at each of the wind turbines in the wind farm, and a plurality of the wind turbines, for example all of the turbines in the wind farm, need to indicate there is ice present before such a positive ice event determination may be made. Therefore, an entire wind farm is advantageously assigned as being affected by ice or not.

When the current ambient temperature is greater than a threshold ambient temperature, the processor may be configured to determine that the ice event has not occurred.

The processor may be configured to determine whether the ice event has occurred in dependence on a comparison between the current wind speed delta distribution and a reference wind speed delta distribution, also referred to as a reference wind speed difference distribution.

During a training period of the wind farm the input may be configured to receive a measured reference wind speed from each of the wind speed sensors, and may be configured to receive an estimated reference wind speed of each of the wind turbines, wherein each of the estimated reference wind speeds is based on the measured power output of the associated wind turbine and/or other relevant performance parameters of the associated wind turbine. The processor may be configured to determine a reference wind speed difference, also referred to as a reference wind speed delta, between the measured reference wind speed and the estimated reference wind speed for each of the wind turbines. The processor may be configured to determine the reference wind speed delta distribution based on the reference wind speed differences, i.e. the differences or deltas between the measured and the estimated reference wind speeds.

Advantageously, the current delta distribution is compared against a reference delta distribution associated with data collected during typical or non-extreme weather conditions, for example data collected during summer months. When the current delta distribution deviates from, or starts becoming extreme compared to, the reference delta distribution then this may indicate that ice is having an effect on the collected data.

During the training period of the wind farm the input may be configured to receive a reference ambient temperature of the wind farm. The processor may be configured to determine the reference wind speed delta distribution based on those of the reference wind speed deltas associated with the reference ambient temperature being greater than a reference threshold temperature. Advantageously, this ensures that the reference data is not affected by ice, and provides an accurate baseline for future comparisons.

The input may be configured to receive a measured further reference wind speed from one or more further wind speed sensors each associated with a further wind turbine. The input may be configured to receive an estimated further reference wind speed of each of the further wind turbines, wherein each of the estimated further reference wind speeds is based on a measured power output of the associated further wind turbine and/or further performance parameters of the associated further wind turbine. The processor may be configured to determine a further reference wind speed difference, also referred to as a further reference wind speed delta, between the measured further reference wind speed and the estimated further reference wind speed for each of the further wind turbines. The processor may be configured to determine the reference wind speed delta distribution based on the further reference wind speed differences or deltas.

By providing the reference wind speed delta distribution with reference data from further wind turbines remote from the wind farm, the amount of reference data may be increased so that a more accurate reference delta distribution from the training period may be obtained. In particular, the training period is undertaken when the weather conditions are such that the risk of an ice event is minimal. If the wind farm is in a geographical location in which the weather conditions are such that ice is possible or even likely for the majority or even all of the year, this limits the opportunity to collect reference data in a training period where the chance of ice is minimal. In such a case, an accurate reference delta distribution may still be compiled using reference data from further wind turbines in a geographical location where there is significant periods of weather conditions where ice is not likely to occur.

The processor may be configured to determine a lower quantile of the current wind speed delta distribution and an upper threshold quantile of the reference wind speed delta distribution. The processor may be configured to determine that the ice event has occurred if the lower quantile is above the upper threshold quantile.

The lower quantile may be a lower percentage quantile than the upper threshold quantile.

The ice event may be that ice is present on one or more blades of the wind turbines.

The processor may be configured to determine an upper quantile of the current wind speed delta distribution and a lower threshold quantile of the reference wind speed delta distribution. The processor may be configured to determine that the ice event has occurred if the upper quantile is below the lower threshold quantile.

The upper quantile may be a higher percentage quantile than the lower threshold quantile.

The ice event may be that ice is present on one or more of the wind speed sensors.

The processor may be configured to determine whether the ice event has occurred at each of a plurality of prescribed time intervals for a prescribed time period. The processor may be configured to make an overall determination of whether the ice event has occurred for the prescribed time interval in dependence on the determination at each of the prescribed time intervals. In particular, the determination at each of the prescribed time intervals may be adjusted or altered to the most common determination over the prescribed time period. Advantageously, this ensures the robustness of the invention by eliminating rogue results or deviations in the weather conditions only for a relatively short time interval.

According to another aspect of the present invention there is provided a method of determining the presence of ice at a wind farm including a plurality of wind turbines each having a wind speed sensor. The method may comprise receiving a current ambient temperature of the wind farm. The method may comprise receiving a current measured wind speed from each of the wind speed sensors. The method may comprise receiving an estimated current wind speed of each of the wind turbines, wherein each of the estimated current wind speeds is based on relevant performance parameters of the associated wind turbine. For example, the relevant performance parameters may include a measured power output of the associated wind turbine. The method may comprise determining a current wind speed difference, also referred to as a current wind speed delta, between the measured current wind speed and the estimated current wind speed for each of the wind turbines. The method may comprise determining a current wind speed difference distribution, also referred to as a current wind speed delta distribution, based on the current wind speed differences. The method may comprise determining whether an ice event has occurred, the determination being in dependence on the current ambient temperature and in dependence on the current wind speed delta distribution. The method may comprise providing an outcome of the ice event determination.

According to another aspect of the present invention there is provided a wind farm comprising a plurality of wind turbines each having a wind speed sensor, the wind farm comprising a controller as described above.

BRIEF DESCRIPTION OF THE DRAWINGS

Embodiments of the invention will now be described by way of example with reference to the accompanying drawings, in which.

DETAILED DESCRIPTION

Figure 1:
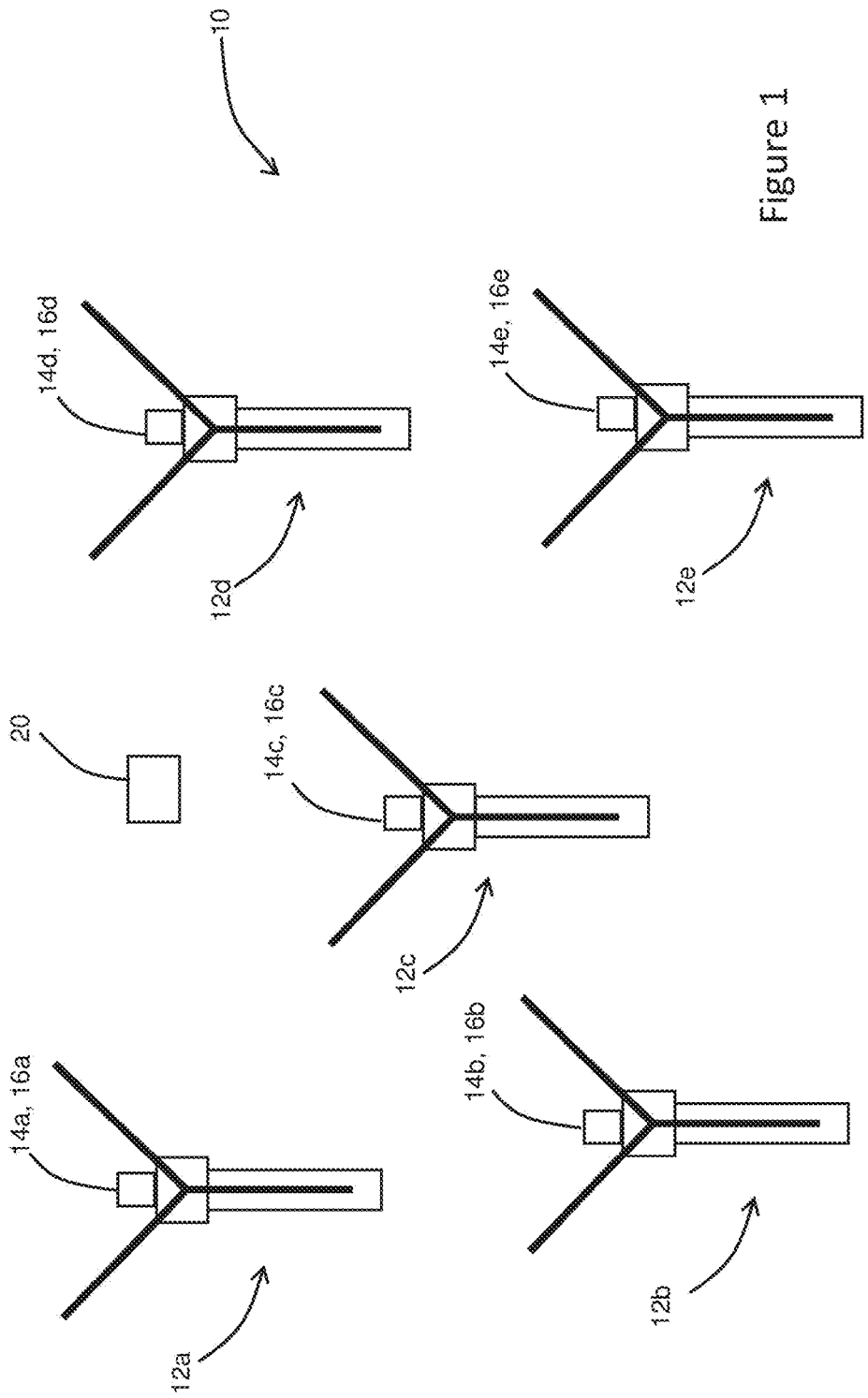
FIG. 1 is a schematic diagram of a wind farm including a plurality of wind turbines and a controller according to an aspect of an embodiment of the invention.

FIG. 1 is a schematic diagram of a wind farm 10 having a plurality of wind turbines 12a-e. Although FIG. 1 shows five wind turbines 12a-e, this is in no way limiting and it will be appreciated that the wind farm 10 may include any number of wind turbines and, in particular, more than five wind turbines.

Each of the wind turbines 12a-e includes a respective wind speed sensor 14a-e, such as a force-torque sensor. Typically, each of the wind sensors 14a-e is mounted atop a nacelle of the respective wind turbine 12a-e, and is in the form of an anemometer. Anemometers come in various different types, for example cup, vane, hot-wire, laser-Doppler and ultrasonic anemometers, all as known in the art. Ultrasonic sensors may be preferred on wind farms that are difficult to access, for example off-shore, as they do not need recalibration. In particular, ultrasonic sensors measure wind speed based on a time-of-flight of sonic pulses between pairs of transducers.

In addition to the measured wind speeds provided by the wind speed sensors 14a-e, an estimated wind speed for each of the wind turbines 12a-e at a given time may be determined. In particular, the wind speed may be predicted or estimated based on parameters and power production data of the wind turbines 12a-e. That is, given a certain measured power output of a particular wind turbine 12a-e, the wind speed needed to result in the measured power output can be estimated using known relationships. The collected data may be normalised for several factors such as for standard air densities, standard air temperatures, and whether the turbines 12a-e are in run, connected or de-rated modes.

During normal weather conditions, in particular when there is no ice present at the wind farm 10, the measured and estimated wind speeds provide similar values for a given turbine 12a-e at a given time. However, when there is ice present at the wind farm 10 then this can cause reduced power output of the wind turbines 12a-e. For example, an ice event in which there is a build-up of ice on one or more blades of the wind turbines 12a-e can result in a deterioration of performance of the turbines and therefore reduced power output. In such a case, the estimated wind speed will deviate from the measured wind speed; in particular, as the power output is lower the estimated wind speed will underestimate the actual wind speed. Another example would be an ice event in which one of the wind speed sensors 14a-e has become frozen or covered with ice. In such a case the wind speed sensor 12a-e may not be functioning correctly and the measured wind speed may be below the actual wind speed such that the estimated wind speed is greater than the measured wind speed.

FIG. 1 also shows that each of the wind turbines 12a-e includes a temperature sensor in the form of a thermometer 16a-e mounted on a nacelle of the respective wind turbine 12a-e, for measuring an ambient temperature, in particular an ambient air temperature, at the wind farm 10. The temperature sensors 16a-e are shown as being on-site at the wind farm 10; however, this need not be the case, and one or more temperature sensors may instead be located somewhere in the vicinity of the wind farm 10. Alternatively, a dedicated temperature sensor may not be needed for the purposes of the present invention, and an indication of the ambient temperature at the wind farm 10 may be provided by a weather station in the vicinity of the wind farm 10.

Figure 2:
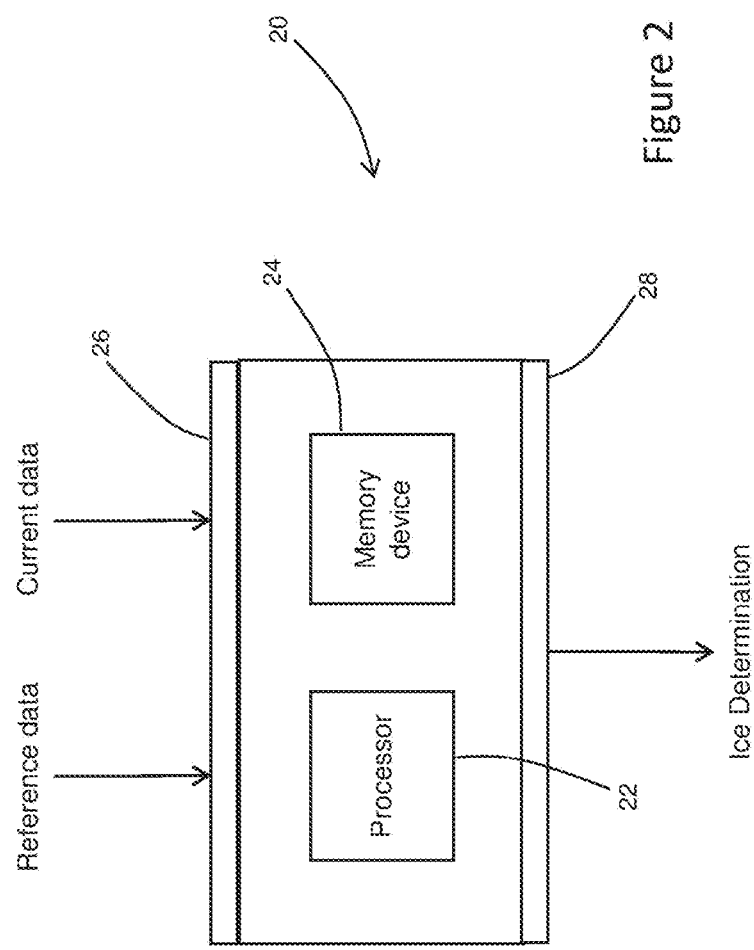
FIG. 2 is a schematic diagram of the controller of FIG. 1, including the inputs to, and outputs from, the controller.

FIG. 1 also shows a controller 20 according to an embodiment of an aspect of the invention. Note that the controller 20 may be located on-site at the wind farm 10 or off-site remote from the wind farm 16. With additional reference to FIG. 2, the controller 20 includes a processor 22, which may be in the form of one or more processors, and a memory device 24. The controller has an input 26 configured to receive the measured wind speed data from the wind speed sensors 14a-e. The input 26 is also configured to receive the estimated wind speeds of each of the wind turbines 12a-e, determined based on the turbine power output as described above. Furthermore, the input 26 is configured to receive the ambient temperature at the wind farm 10 from the temperature sensors 16a-e.

The processor 22 is configured to use the measured and estimated wind speeds from the plurality of wind turbines 12a-e determine whether ice is present at the wind farm, i.e. whether an ice event is occurring, as described in greater detail below. The controller 20 also has an output 28 which provides the outcome of the ice event determination. The ice event determination can be used not only to give an indication of the reliability of the measured and estimated wind speeds, but also to inform a decision whether to activate one or more anti-icing systems of the wind turbines 12a-e.

Figure 3:
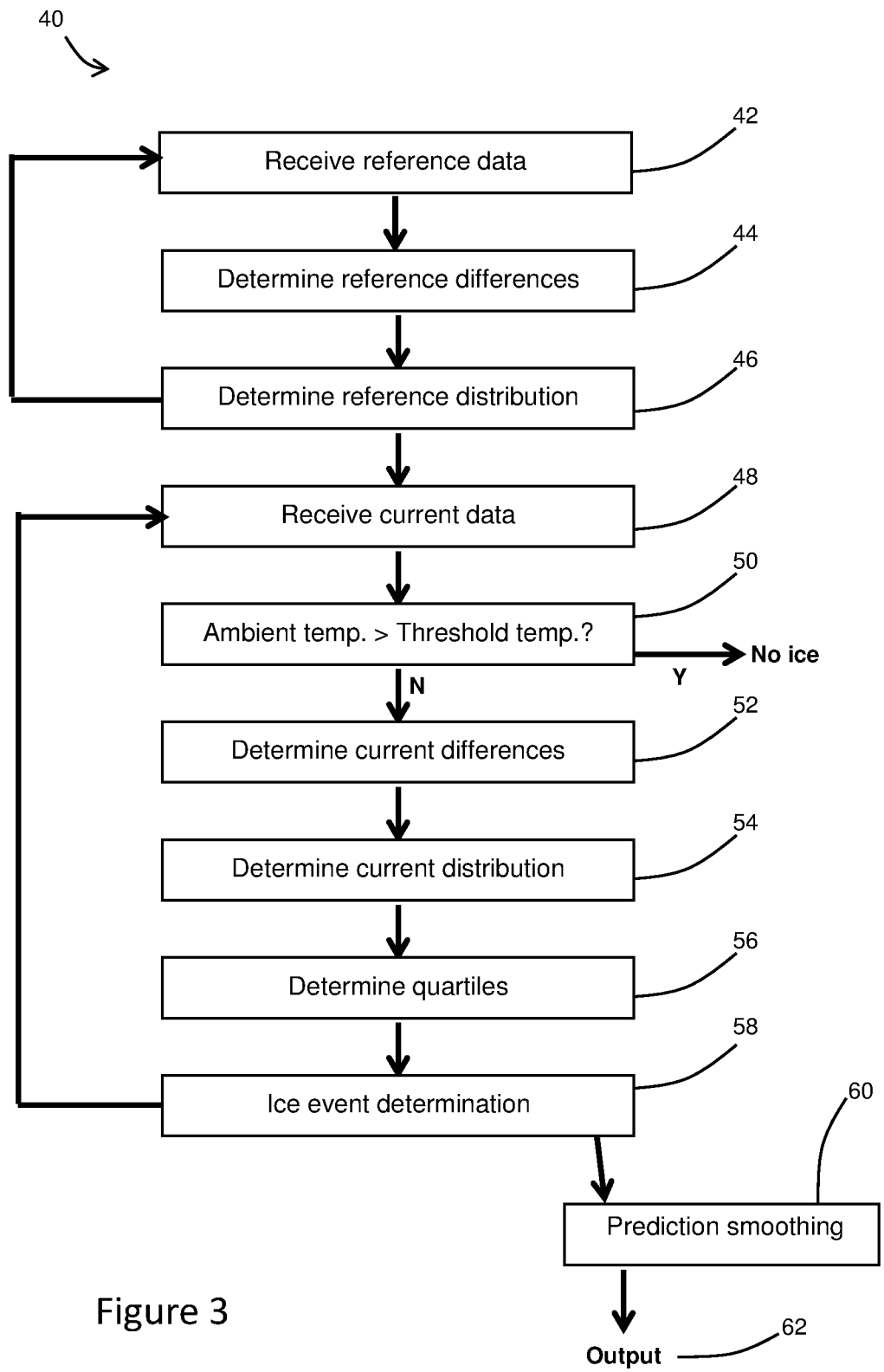
FIG. 3 is a flow diagram showing the steps of a method performed by the controller of FIG. 1; and, FIG. 4 shows examples of delta distributions between measured and estimated wind speeds of the wind turbines of FIG. 1; in particular.

FIG. 3 shows the steps of a method 40 performed by the controller 20 in order to determine whether there is ice present at the wind farm 10. The controller 20 and wind farm 10 initially goes through a training period. The training period is undertaken to understand the relationship and differences between the measured and estimated wind speeds during periods of non-extreme weather, in particular during periods where there is minimal or zero chance of ice being present, e.g. during summer. The training period is therefore undertaken when the ambient air temperature at the wind farm 10 is greater than a threshold ambient temperature, the threshold ambient temperature indicating a maximum ambient temperature at which ice may form at the wind farm 10. For example, the threshold ambient temperature may be approximately 4 degrees Celsius; however, other values may also be useful. The measurements or estimations made during the training period may be considered to be baseline, normal, usual, or reference values associated with each of the wind turbines 12a-e. Specifically, the data collected during the training period will be referred to as reference data.

The method 40 begins at the training period and at step 42 the input 26 receives a measured reference wind speed from each of the wind speed sensors 12a-e at a given time. The input 26 also receives a corresponding estimated reference wind speed for each of the measured reference wind speeds, the estimated reference wind speed being based on the measured power output of the wind turbines 12a-e. At step 44 the processor 22 determines the difference or delta between the measured reference wind speed and the associated estimated reference wind speed for each of the wind turbines 12a-e. At step 46 the processor 22 determines a distribution of the differences or deltas of the reference measured and estimated wind speeds.

This provides an overview at a single timestamp. At the next timestamp, the input 26 again receives measured and estimated reference wind speeds for each of the wind turbines 12a-e at step 42, and again determines the differences therebetween at step 44. These differences are then added to the delta distribution already including the differences from the previous timestamp at step 46 in a cumulative manner. The interval between successive timestamps may be any suitable interval of time, for example every few minutes such as every ten minutes. Also, the training period may be any suitable period of time, for example a few weeks or a few months, but should be sufficient to form an accurate description of the distribution of differences between measured and estimated wind speeds during non-extreme weather conditions, i.e. periods of no ice events. The reference wind speed delta distribution from the training period may be stored in the memory device 24.

Note that the reference wind speed delta distribution may not be limited to reference data obtained from the wind farm 10. In particular, the reference wind speed delta distribution may include data from further wind turbines located in further wind turbines remote from the wind farm 10. In order that the reference data from the further wind turbines is relevant and applicable to the wind farm 10, then data may be collected from further wind turbines that are the same or a similar model to the wind turbines 12a-e in the wind farm 10. The data from the further wind turbines may be collected during the same training period as the wind turbines 12a-e, or may already be pre-stored.

Once the training period has been completed, the controller 20 is ready to make real-time determinations about the presence of ice at the wind farm 10. That is, once the training period is complete, at step 46 the method 40 does not loop back to step 42, but instead proceeds to step 48. In particular, at step 48 the input 26 receives a measured current wind speed from each of the wind speed sensors 12a-e at a given time. The input 26 also receives a corresponding estimated current wind speed for each of the measured current wind speeds, the estimated current wind speed being based on the measured power output of the wind turbines 12a-e at the given time. The estimated current wind speed may also be based on other relevant performance parameters of the wind turbines 12a-e at the given time. In addition, at step 48 the input 26 receives the current ambient temperature at the wind farm 10 from the temperature sensors 16a-e.

At step 50 the processor 22 makes an initial determination as to whether there is currently an ice event at the wind farm 10. This initial determination is based on the current ambient temperature. It is considered that the ambient temperature at the wind farm 10 must be below a threshold temperature for there to be a possibility of ice being present at the wind farm 10. In particular, this threshold temperature may be considered to be the maximum temperature at which ice may be present. For example, the threshold temperature may be around four degrees Celsius. If the current ambient temperature is greater than the threshold temperature then the processor 22 determines that an ice event is not currently occurring at the wind farm 10 at that particular timestamp without any further analysis, and the process 40 may loop back to step 48 to receive the next set of data for the next timestamp. If, however, the current ambient temperature is less than the threshold temperature then the process 40 proceeds to step 52.

Figure 4A:
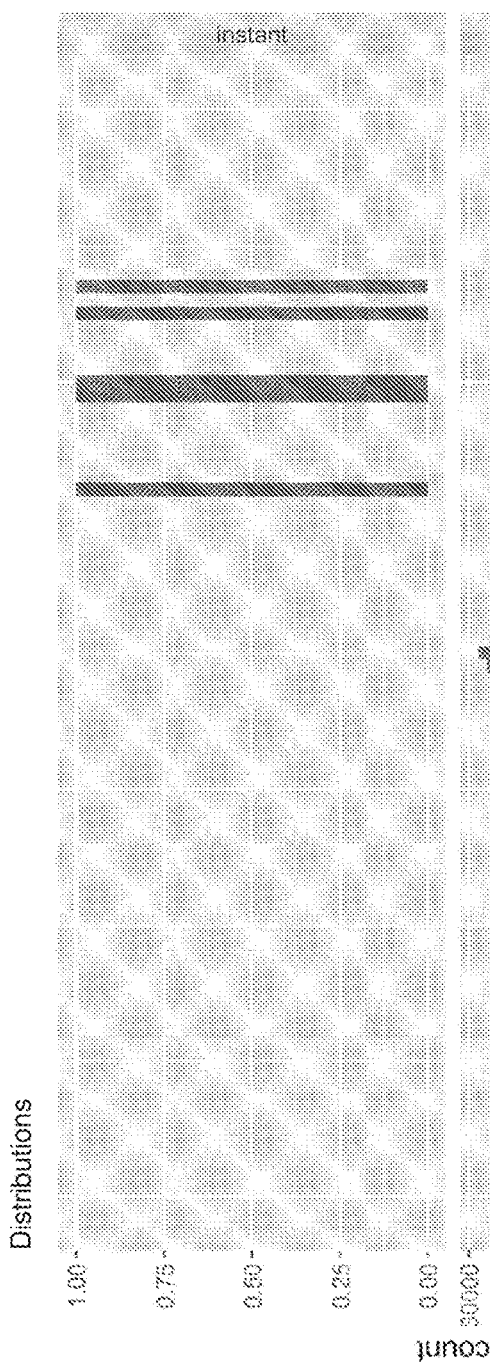
FIG. 4(a) shows a current delta distribution.
Figure 4B:
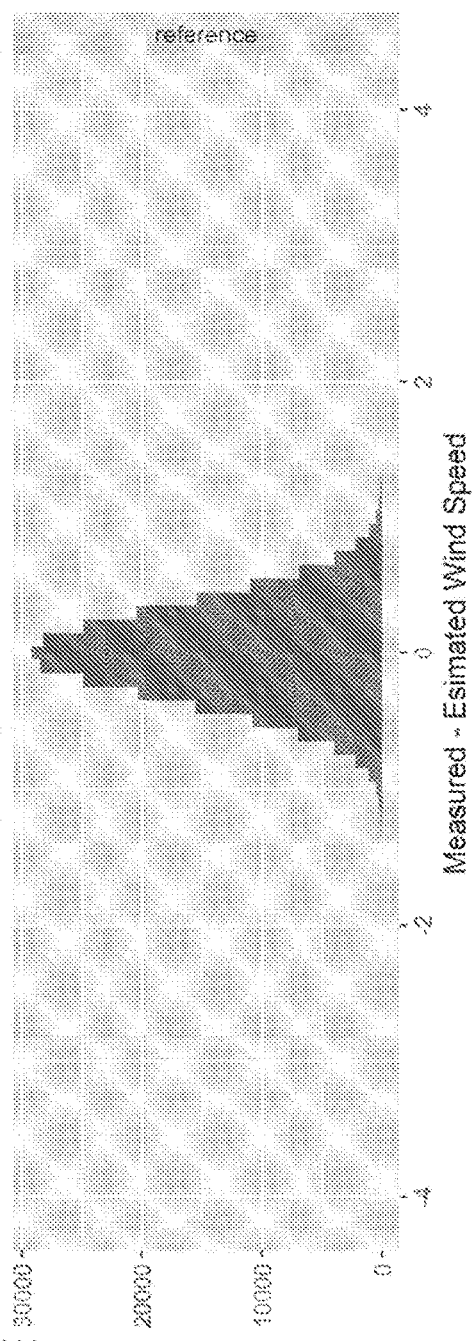
FIG. 4(b) shows a reference delta distribution.

At step 52 the processor 22 determines the difference or delta between the measured current wind speed and the associated estimated current wind speed for each of the wind turbines 12a-e. At step 54 the processor 22 determines a distribution of the differences or deltas of the current measured and estimated wind speeds. FIG. 4a shows an example of the current difference distribution (current delta distribution) when the ambient temperature is below the threshold temperature, i.e. below four degrees Celsius. Similarly, FIG. 4b shows an example of the reference difference distribution, i.e. when the ambient temperature is above the threshold temperature. The processor 22 compares the distribution of the current differences with the stored distribution of reference differences. By inspection, it is seen that at warmer temperatures (FIG. 4b) a relatively narrow (reference) distribution centred on zero is obtained. In contrast, a (current) distribution at colder temperatures (FIG. 4a) may be centred at a value higher than zero with a small or minimal overlap with the reference distribution. A displacement in the distribution towards higher positive numbers indicates that the turbines are under-performing. A displacement in the distribution towards lower numbers indicates that the sensors 14a-e may be frozen.

In order to make such a comparison, at step 56 the processor 22 determines a number of features of the current and reference delta distributions. In particular, at step 56 the processor 22 determines a number of quantiles of each of the current and reference delta distributions. As is known, a quantile divides a probability distribution into intervals of equal probability. The number of intervals is dependent on the particular quantile chosen. The following example is for illustrative purposes only, and the particular value of each of the quantiles can be chosen to be any suitable value.

In the described embodiment, at step 56 the processor 22 calculates the 0.05 and 0.95 quantiles of the reference distribution of differences. In FIG. 4b for example, the 0.05 quantile is the cut-point along the 'Corrected diff' axis (x-axis) at which there is a 5% probability that the reference difference lies to the left of the cut-point. Similarly, the 0.95 quantile is the cut-point along the 'Corrected diff' axis at which there is a 95% probability that the reference difference lies to the left of the cut-point. Also at step 56, the processor 22 calculates the 0.25 and 0.75 quantiles of the current distribution of differences.

At step 58, the processor 22 then determines an indication of whether there is an ice event currently occurring at the wind farm 10 based on the calculated quantiles. In particular, the processor 22 compares the 0.25 quantile of the current delta distribution with the 0.95 quantile of the reference delta distribution. If the 0.25 quantile of the current or timestamp delta distribution is above the 0.95 quantile of the reference delta distribution then the processor 22 determines that there is an ice event occurring. Specifically, this positive bias of the current delta distribution indicates that ice is likely present on one or more blades of the wind turbines 12a-e at the wind farm 10. If this first comparison does not indicate an ice evet then the processor 22 compares the 0.75 quantile of the current delta distribution with the 0.05 quantile of the reference delta distribution. If the 0.75 quantile of the current or timestamp delta distribution is below the 0.05 quantile of the reference delta distribution then the processor 22 determines that there is an ice event occurring. Specifically, this negative bias of the current delta distribution indicates that ice is likely present on the sensors 14a-e of the wind turbines 12a-e at the wind farm 10, i.e. the wind speed sensors 14a-e are frozen. If neither of these comparison results in a positive determination of an ice event then the processor 22 determines that no ice event is occurring at the current timestamp.

After the ice event determination for the current timestamp has been made at step 58, the process 40 loops back to step 48 to receive the data for the next timestamp. There may be a prescribed time interval between each timestamp, for example ten minutes. The received data at step 48 may be corrected by a rolling average of the received values over a prescribed interval.

Once the processor 22 has made a determination on the presence of ice at a plurality of timestamps over a prescribed time period, the process 40 optionally proceeds to step 60 to make an overall smoothing of the determination as to whether ice has been present at the wind farm in a given time frame or period. For example, the prescribed time period may be three hours, and so the processor 22 makes eighteen determinations regarding the presence of ice in this time (one at each timestamp, i.e. every ten minutes). Each ice event is likely to last for several hours at a time, and so any inconsistency within the plurality of determinations in the prescribed time period is considered not to be correct. Hence, at step 60 the processor 22 determines what the most common determination was over the prescribed rolling time period, i.e. ice event or no ice event, and then amends the determinations at each of the plurality of timestamps in the prescribed time period to all be the most common determination in the rolling window. That is, the processor 22 makes an overall determination for the prescribed time period of whether ice is present at the wind farm 10 or not.

The ice determination will then be output at step 62. Each timestamp determination may also be output. This overall determination may then be used to inform a decision as to whether to include data received during the prescribed time period when assessing the current performance of the wind turbines 12a-e to, for example, evaluate the need of one or more of the turbines to be fitted with after-sale upgrades or evaluate the improvements in performance of a turbine that has been fitted with such an upgrade. In particular, if the overall determination is that ice has not been present in the prescribed time period, then the data received during this time may be used in such evaluations. In contrast, if the overall determination is that ice has been present in the prescribed time period, then the data received during this time has likely been skewed by the presence of ice and so this data may be discarded for the above evaluations.

Many modifications may be made to the above-described embodiments without departing from the scope of the present invention as defined in the accompanying claims.

In the above-described embodiment, the controller 20 determines the reference wind speed delta distributions from the training period; however, in different embodiments the reference delta distributions, and any associated calculations from the training period, may be undertaken off-board the controller and the results may simply be received at the input, or loaded from the memory device, ready for the real-time ice event determination.

In the above-described embodiment, the reference delta distribution includes reference data from both the wind turbines 12a-e at the wind farm 10 and from further wind turbines that are remote from the wind farm 10. In different embodiments, however, the reference delta distribution may include reference data from the wind turbines 12a-e only, or from further wind turbines remote from the wind farm 10 only. In particular, the latter case may be useful in the event that the collection of reference data from the wind turbines 12a-e is not possible.

In the above-described embodiment, the overall determination is based simply on the most common determination from the timestamps in the prescribed time period. In different embodiments, however, any prescribed number or percentage of positive ice determinations may be needed in the prescribed time period to result in an overall determination of ice being present at the wind farm.

The invention claimed is:

1. A controller for determining the presence of ice at a wind farm including a plurality of wind turbines each having a wind speed sensor, the controller comprising:
   an input configured to receive:
      a current ambient temperature of the wind farm;
      a measured current wind speed from each of the wind speed sensors;
      an estimated current wind speed of each of the wind turbines, wherein each of the estimated current wind speeds is based on at least one measured performance parameter of an associated wind turbine within the plurality of wind turbines; and
   a processor configured to:
      train the plurality of wind turbines within the wind farm to generate a reference delta distribution, wherein the training comprises operating the plurality of wind turbines in an environment having a reference ambient temperature greater than a reference threshold temperature;
      upon determining that the current ambient temperature is lower than the reference threshold temperature, determine a current wind speed difference between the measured current wind speed and the estimated current wind speed for each of the wind turbines;
      generate a current delta distribution based on the current wind speed differences, wherein the current delta distribution comprises one or more quantiles, and each quantile indicates a percentage of the current wind speed differences falling below a certain value within the current delta distribution; and
      upon determining that an ice event has occurred by comparing the current delta distribution with the reference delta distribution, discard data collected by the wind speed sensors during a prescribed period of time, wherein the ice event comprises ice being present on one or more of the wind speed sensors or one or more blades of the wind turbines during the prescribed period of time.

2. The controller according to claim 1, wherein when the current ambient temperature is greater than a threshold ambient temperature, the processor is configured to determine that the ice event has not occurred.

3. The controller according to claim 1, wherein, during a training period of the wind farm:
   the input is configured to receive:
      a measured reference wind speed from each of the wind speed sensors;
      an estimated reference wind speed of each of the wind turbines, wherein each of the estimated reference wind speeds is based on the at least one measured performance parameter of the associated wind turbine; and
   the processor is configured to:

determine a reference wind speed difference between the measured reference wind speed and the estimated reference wind speed for each of the wind turbines; and determine the reference delta distribution based on the reference wind speed differences.

4. The controller according to claim 3, wherein, during the training period of the wind farm:

the input is configured to receive the reference ambient temperature of the wind farm; and the processor is configured to determine the reference delta distribution based on those of the reference wind speed differences associated with the reference ambient temperature being greater than the reference threshold temperature.

5. The controller according to claim 1, wherein:

the input is configured to receive:

a measured further reference wind speed of each of a plurality of further wind turbines, wherein the measured further reference is from a further wind speed sensor associated with a respective further wind turbine of the plurality of further wind turbines; and an estimated further reference wind speed of each of the plurality of further wind turbines, wherein the estimated further reference wind speed is based on at least one measured performance parameter of a respective further wind turbine of the plurality of further wind turbines; and the processor is configured to:

determine a further reference wind speed difference between the measured further reference wind speed and the estimated further reference wind speed for each of the plurality of further wind turbines; and determine the reference delta distribution based on the further reference wind speed difference for each of the plurality of further wind turbines.

6. The controller according to claim 1, the processor being configured to determine a lower quantile of the current delta distribution and an upper threshold quantile of the reference delta distribution, and the processor being configured to determine that the ice event has occurred if the lower quantile is above the upper threshold quantile.

7. The controller according to claim 6, wherein the lower quantile is a lower percentage quantile than the upper threshold quantile.

8. The controller according to claim 1, the processor being configured to determine an upper quantile of the current delta distribution and a lower threshold quantile of the reference delta distribution, and the processor being configured to determine that the ice event has occurred if the upper quantile is below the lower threshold quantile.

9. The controller according to claim 8, wherein the upper quantile is a higher percentage quantile than the lower threshold quantile.

10. The controller according to claim 1, the processor being configured to determine whether the ice event has occurred at each of a plurality of prescribed time intervals for a prescribed time period, and the processor being configured to make an overall determination of whether the ice event has occurred for the prescribed time interval in dependence on the determination at each of the prescribed time intervals.

11. A method of determining the presence of ice at a wind farm including a plurality of wind turbines each having a wind speed sensor, the method comprising:

receiving a current ambient temperature of the wind farm;

receiving a current measured wind speed from each of the wind speed sensors;

receiving an estimated current wind speed of each of the wind turbines, wherein each of the estimated current wind speeds is based on at least one measured performance parameter of an associated wind turbine within the plurality of wind turbines;

training the plurality of wind turbines within the wind farm to generate a reference delta distribution, wherein the training comprises operating the plurality of wind turbines in an environment having a reference ambient temperature greater than a reference threshold temperature;

upon determining that the current ambient temperature is lower than the reference threshold temperature, determining a current wind speed difference between the measured current wind speed and the estimated current wind speed for each of the wind turbines;

generating a current delta distribution based on the current wind speed differences, wherein the current delta distribution comprises one or more quantiles, and each quantile indicates a percentage of the current wind speed differences falling below a certain value within the current delta distribution; and upon determining that an ice event has occurred by comparing the current delta distribution with the reference delta distribution, discarding data collected by the wind speed sensors during a prescribed period of time, wherein the ice event comprises ice being present on one or more of the wind speed sensors or one or more of the plurality of wind turbines during the prescribed period of time.

12. The method of claim 11, further comprising determining that the ice event has not occurred when the current ambient temperature is greater than a threshold ambient temperature.

13. The method of claim 11, further comprising:

determining a lower quantile of the current delta distribution and an upper threshold quantile of the reference delta distribution, and determining that the ice event has occurred if the lower quantile is above the upper threshold quantile.

14. The method of claim 13, wherein the lower quantile is a lower percentage quantile than the upper threshold quantile.

15. The method of claim 11, further comprising:

determining an upper quantile of the current delta distribution and a lower threshold quantile of the reference delta distribution, and determining that the ice event has occurred if the upper quantile is below the lower threshold quantile.

16. The method of claim 15, wherein the upper quantile is a higher percentage quantile than the lower threshold quantile.

17. A wind farm comprising a plurality of wind turbines each having a wind speed sensor, the wind farm comprising a controller for determining the presence of ice; the controller, comprising:

an input configured to receive:

a current ambient temperature of the wind farm;

a measured current wind speed from each of the wind speed sensors;

an estimated current wind speed of each of the wind turbines, wherein each of the estimated current wind speeds is based on at least one measured performance parameter of an associated wind turbine within the plurality of wind turbines; and a processor configured to:
    train the plurality of wind turbines within the wind farm to generate a reference delta distribution, wherein the training comprises operating the plurality of wind turbines in an environment having a reference ambient temperature greater than a reference threshold temperature;
    upon determining that the current ambient temperature is lower than the reference threshold temperature, determine a current wind speed difference between the measured current wind speed and the estimated current wind speed for each of the wind turbines;
    generate a current delta distribution based on the current wind speed differences, wherein the current delta distribution comprises one or more quantiles, and each quantile indicates a percentage of the current wind speed differences falling below a certain value within the current delta distribution; and
    upon determining that an ice event has occurred by comparing the current delta distribution with the reference delta distribution, discard data collected by the wind speed sensors during a prescribed period of time, wherein the ice event comprises ice being present on one or more of the wind speed sensors or one or more blades of the wind turbines during the prescribed period of time.

18. The wind farm according to claim 17, wherein when the current ambient temperature is greater than a threshold ambient temperature, the processor is configured to determine that the ice event has not occurred.

19. The wind farm according to claim 17, wherein, during a training period of the wind farm:
    the input is configured to receive:
        a measured reference wind speed from each of the wind speed sensors; and
        an estimated reference wind speed of each of the wind turbines, wherein each of the estimated reference wind speeds is based on the at least one measured performance parameter of the associated wind turbine; and
    the processor is configured to:
        determine a reference wind speed difference between the measured reference wind speed and the estimated reference wind speed for each of the wind turbines; and
        determine the reference delta distribution based on the reference wind speed differences.

20. The wind farm according to claim 19, wherein, during the training period of the wind farm:
    the input is configured to receive the reference ambient temperature of the wind farm; and
    the processor is configured to determine the reference delta distribution based on those of the reference wind speed differences associated with the reference ambient temperature being greater than the reference threshold temperature.

* * * * *